United States Patent [19]
Scaramucci

[11] Patent Number: 5,143,112
[45] Date of Patent: Sep. 1, 1992

[54] TOP-ENTRY CHECK VALVE WITH CARTRIDGE SECURED BY THREADED PROJECTIONS

[76] Inventor: John P. Scaramucci, 10724 Woodridden, Oklahoma City, Okla. 73170

[21] Appl. No.: 762,811

[22] Filed: Sep. 18, 1991

[51] Int. Cl.5 .................. F16K 15/03; F16K 43/00
[52] U.S. Cl. .................. 137/315; 137/454.2; 137/527.8
[58] Field of Search .................. 137/315, 454.5, 454.6, 137/515.7, 527, 527.4, 527.6, 527.8, 327, 328; 251/360, 364

[56] References Cited

U.S. PATENT DOCUMENTS

| | | |
|---|---|---|
| 326,549 | 9/1885 | D'Este .................. 137/527 |
| 485,745 | 11/1892 | Loveland . |
| 556,636 | 3/1896 | Kuichling . |
| 846,317 | 3/1907 | Kiddle .................. 137/527.4 |
| 1,399,684 | 12/1921 | Belcher .................. 137/527 |
| 1,647,036 | 10/1927 | Dileo . |
| 1,668,456 | 5/1928 | Jennings .................. 137/527 |
| 1,827,913 | 10/1931 | Rymal . |
| 2,021,532 | 11/1935 | Wainford .................. 137/454.6 |
| 2,048,088 | 7/1936 | Wagner .................. 251/126 |
| 2,282,532 | 5/1942 | Shenk .................. 251/123 |
| 2,654,388 | 10/1953 | Glass .................. 137/527.8 |
| 2,844,164 | 7/1958 | Robbins .................. 137/454.6 |
| 2,918,934 | 12/1959 | Wheatley .................. 137/527.2 |
| 2,923,317 | 2/1960 | McInerney .................. 137/527.2 |
| 2,928,416 | 3/1960 | Balhouse .................. 137/527.8 |
| 3,075,547 | 1/1963 | Scaramucci .................. 137/516.2 |
| 3,119,594 | 1/1964 | Heggem .................. 251/228 |
| 3,295,550 | 1/1967 | Scaramucci .................. 137/527.4 |
| 3,366,137 | 1/1968 | Hansen .................. 137/527.8 |
| 3,394,731 | 7/1968 | Elliott .................. 137/527.8 |
| 3,817,277 | 6/1974 | Wheatley .................. 137/515.7 |
| 3,934,608 | 1/1976 | Guyton .................. 137/527.8 |
| 4,201,241 | 5/1980 | Schertler .................. 137/527 |
| 4,223,697 | 9/1980 | Pendleton .................. 137/527.8 |
| 4,230,150 | 10/1980 | Scaramucci .................. 137/527 |
| 4,252,144 | 2/1981 | Scaramucci .................. 137/454.6 |
| 4,307,747 | 12/1981 | Carpentier .................. 137/315 |
| 4,508,139 | 4/1985 | Teumer .................. 137/315 |
| 4,556,083 | 12/1985 | Schleiter, Sr. .................. 137/515.7 |

FOREIGN PATENT DOCUMENTS 1806409  9/1969  Fed. Rep. of Germany .
4412462  6/1969  Japan .

Primary Examiner—George L. Walton
Attorney, Agent, or Firm—Dunlap Codding Lee

[57] ABSTRACT

A top-entry check valve having a seat, cage, disc and removable bonnet utilizes threaded projections engaging the valve body to prevent movement of the seat, cage and disc in the downstream direction. An annular shoulder in the valve body prevents movement of the seat, cage and disc in the upstream direction. The disc has a hinge pin which is cradled in hinge pin supports of the cage to hold the disc in place. Removal of the bonnet allows access to the valve chamber for replacement of the seat, cage, disc or threaded projections.

21 Claims, 16 Drawing Sheets

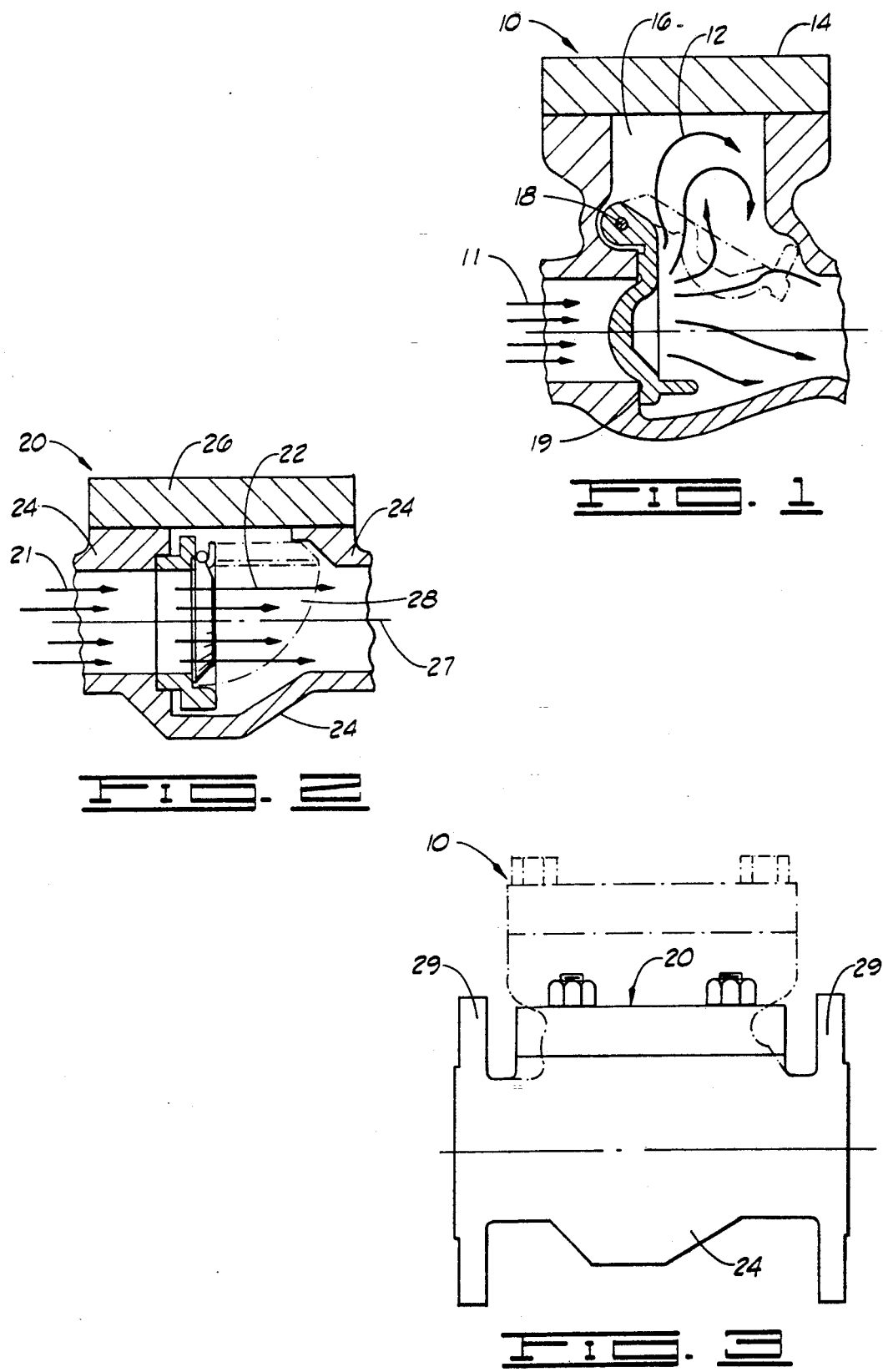

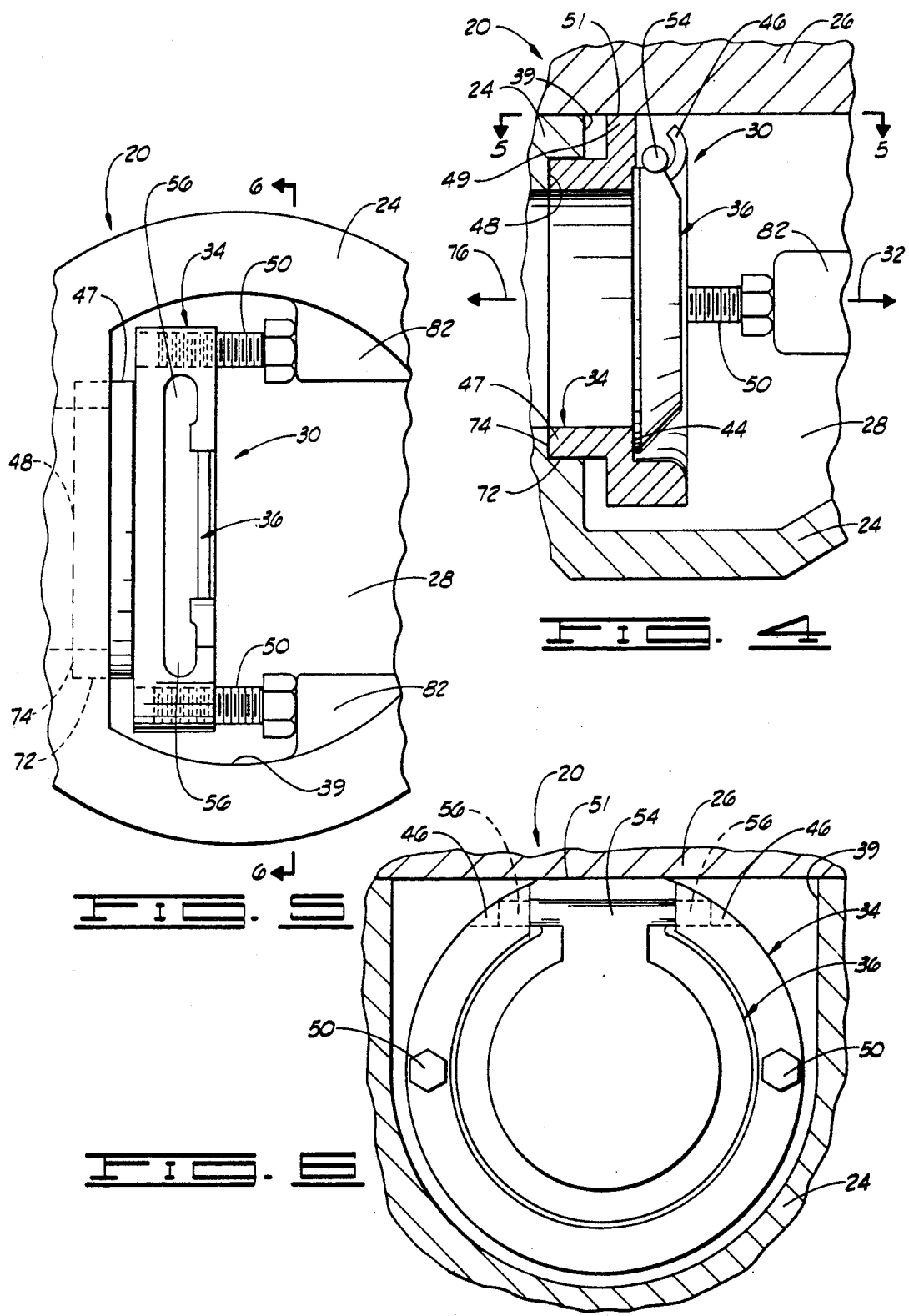

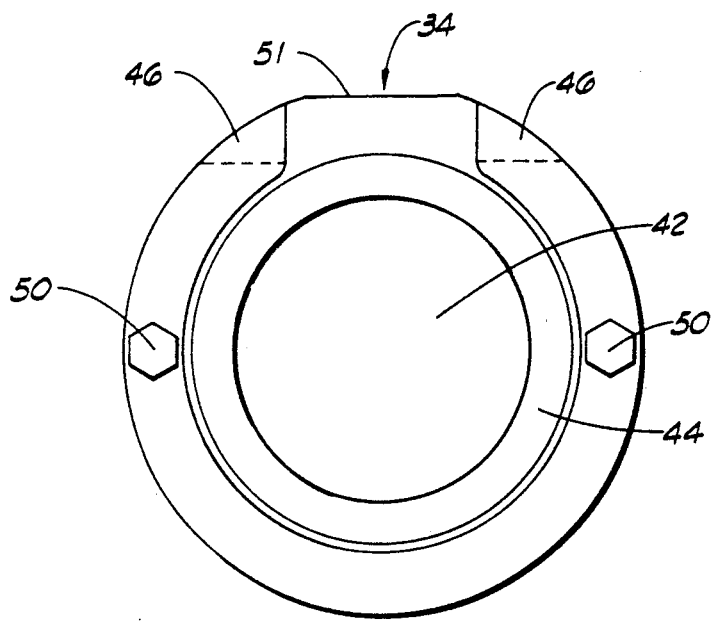
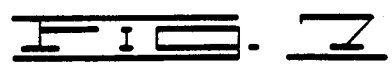
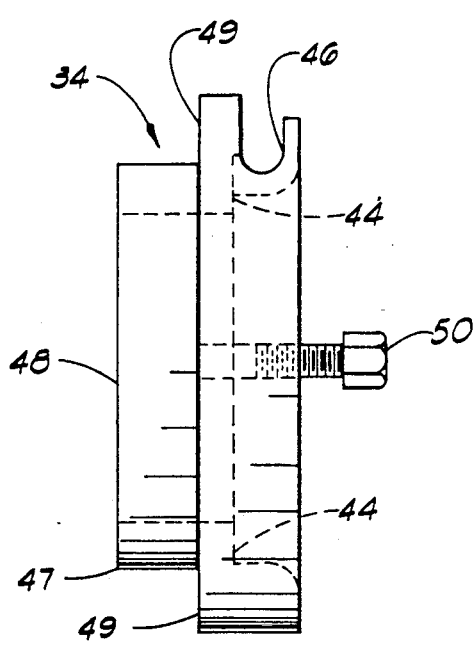
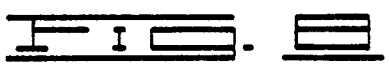
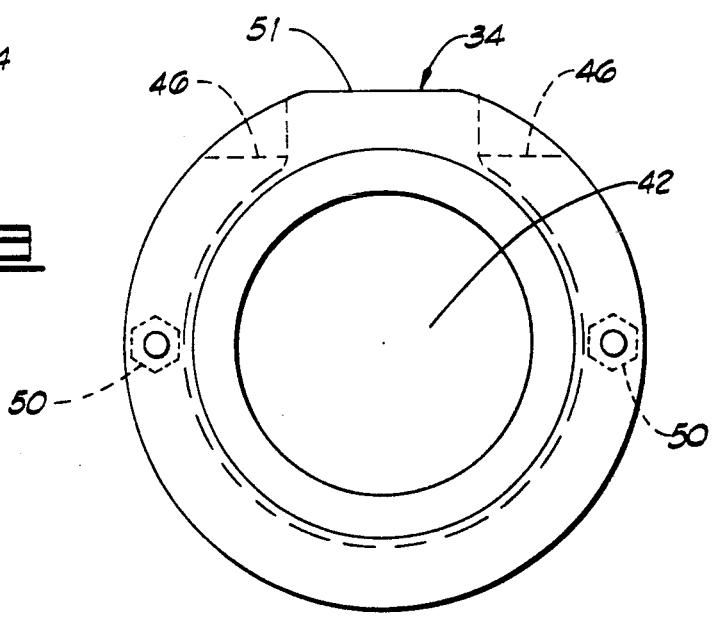
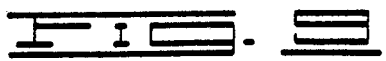

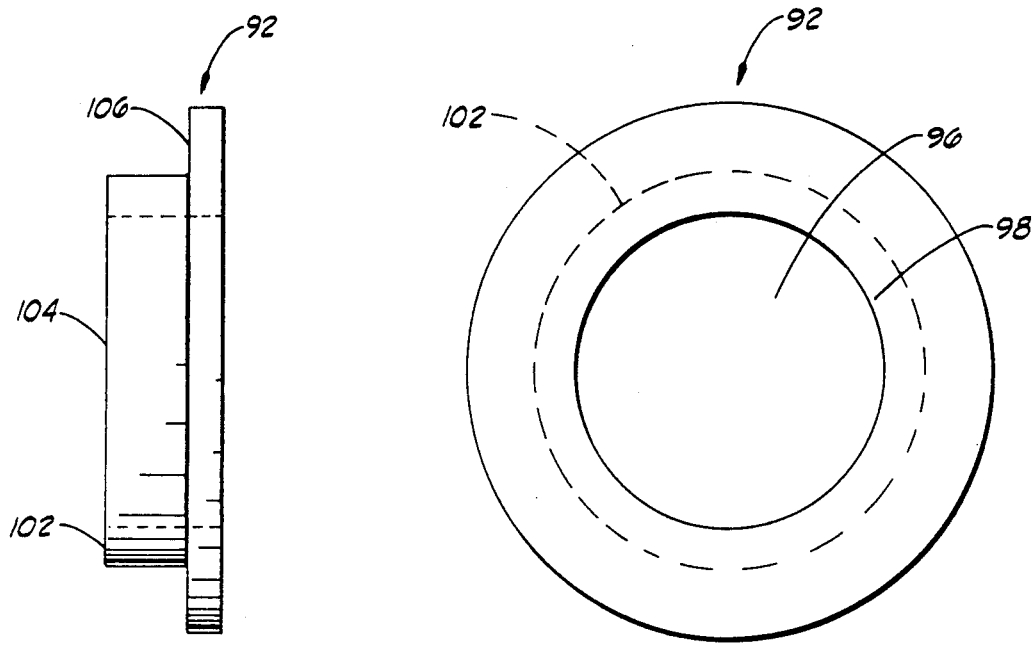
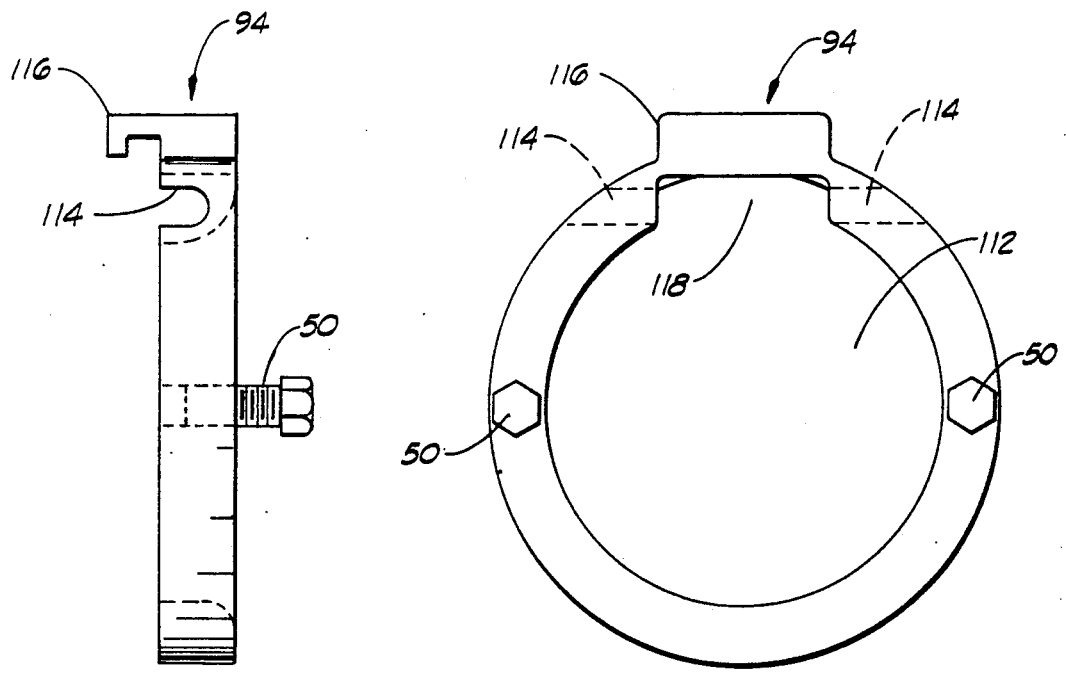

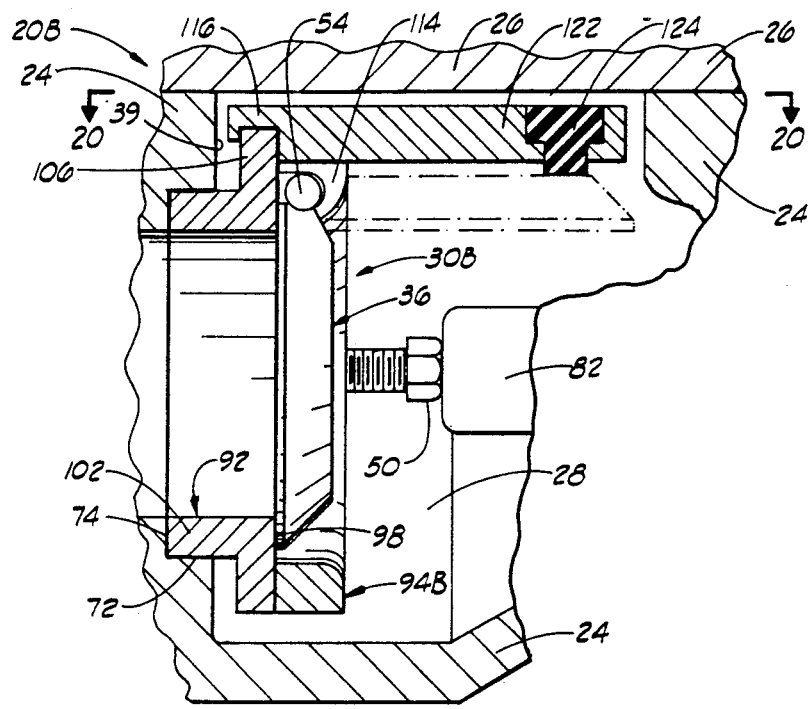
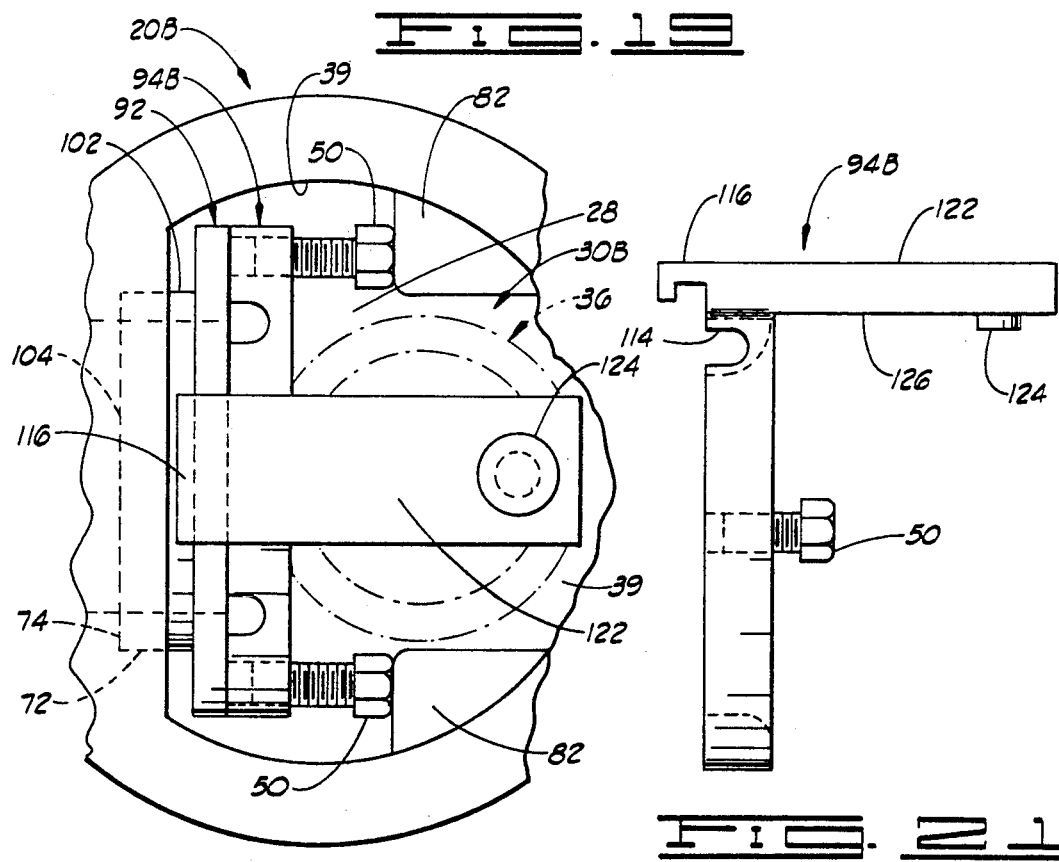

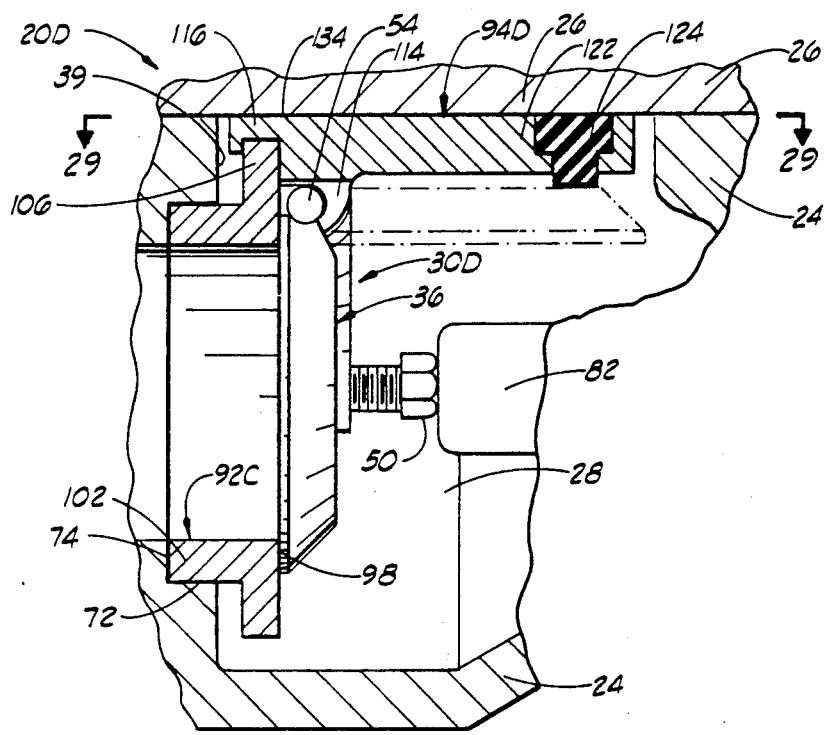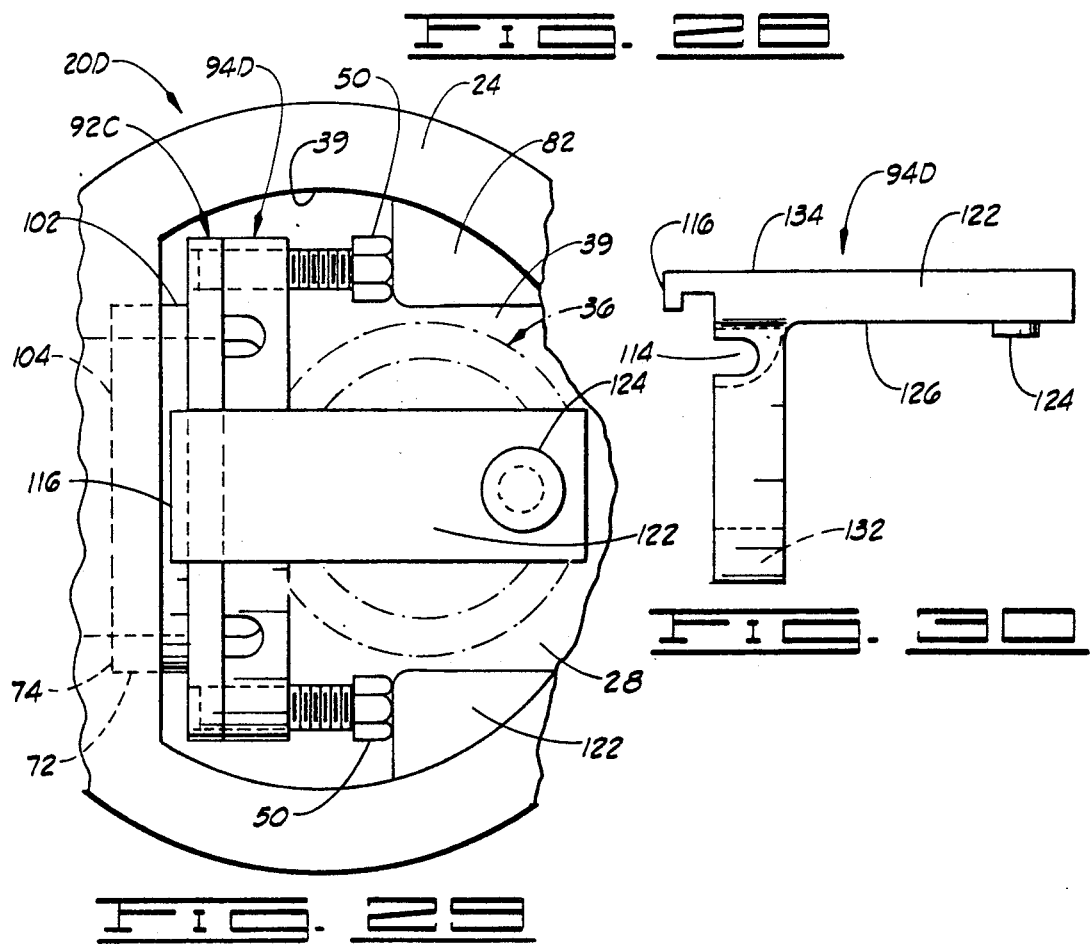

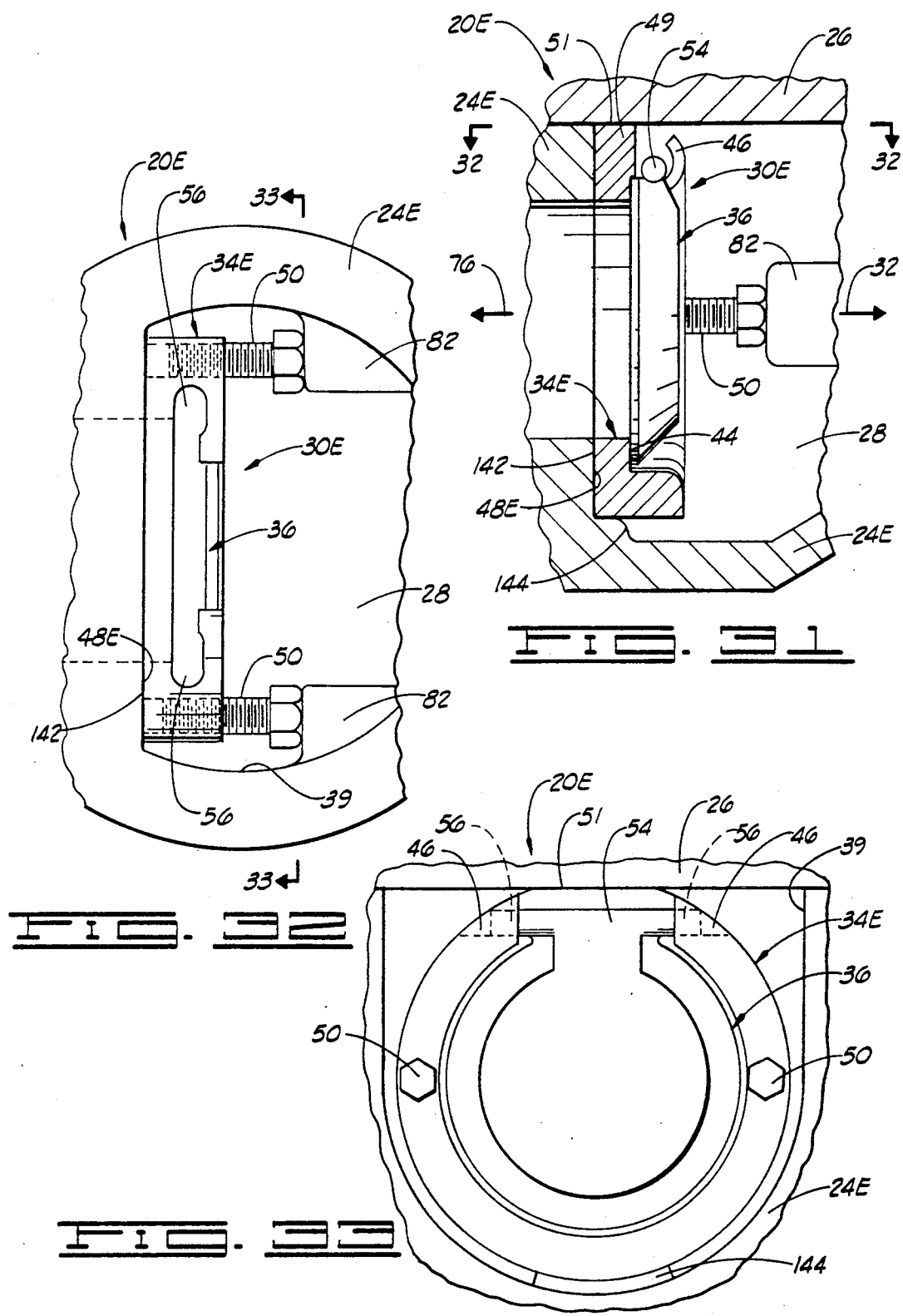

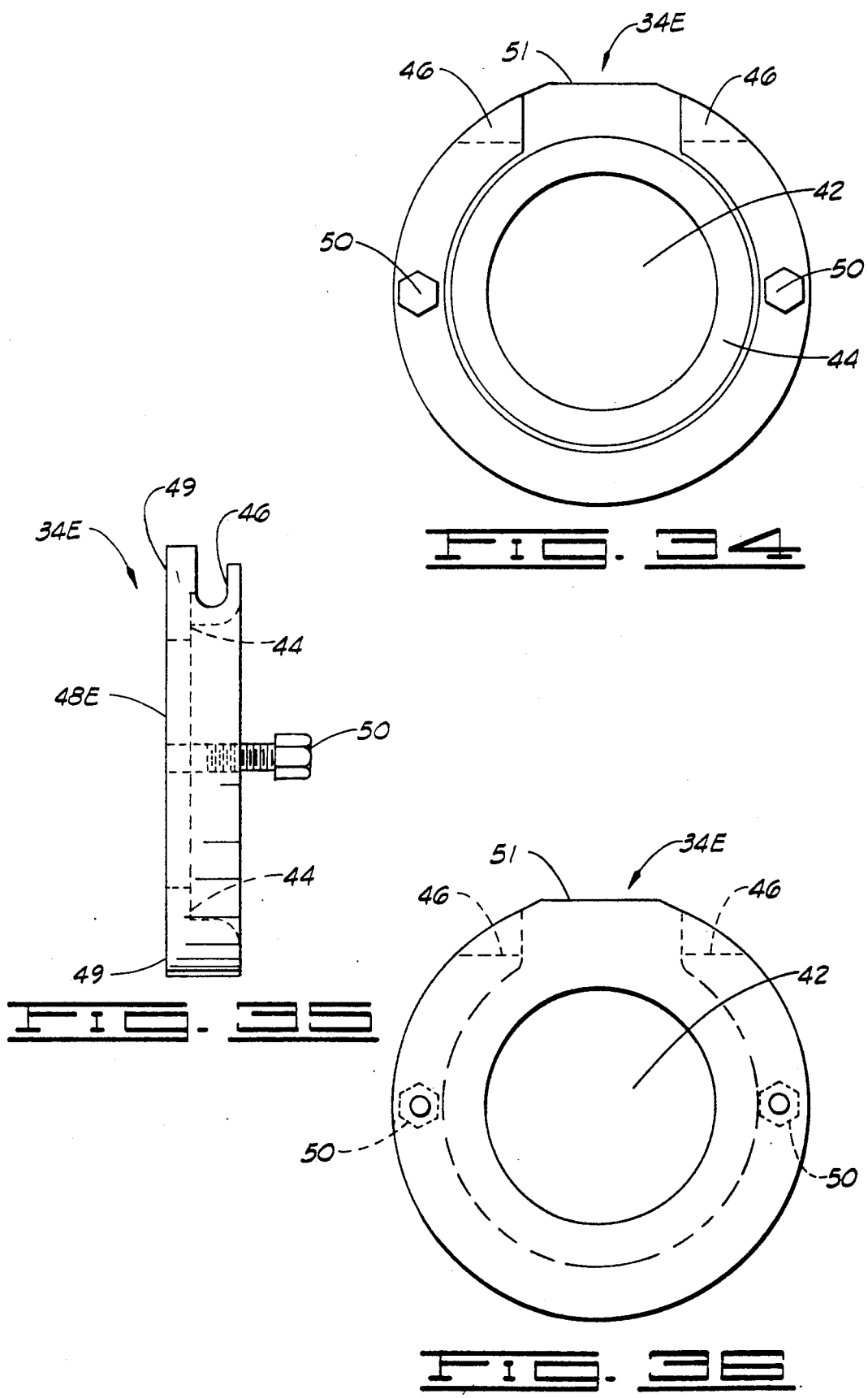

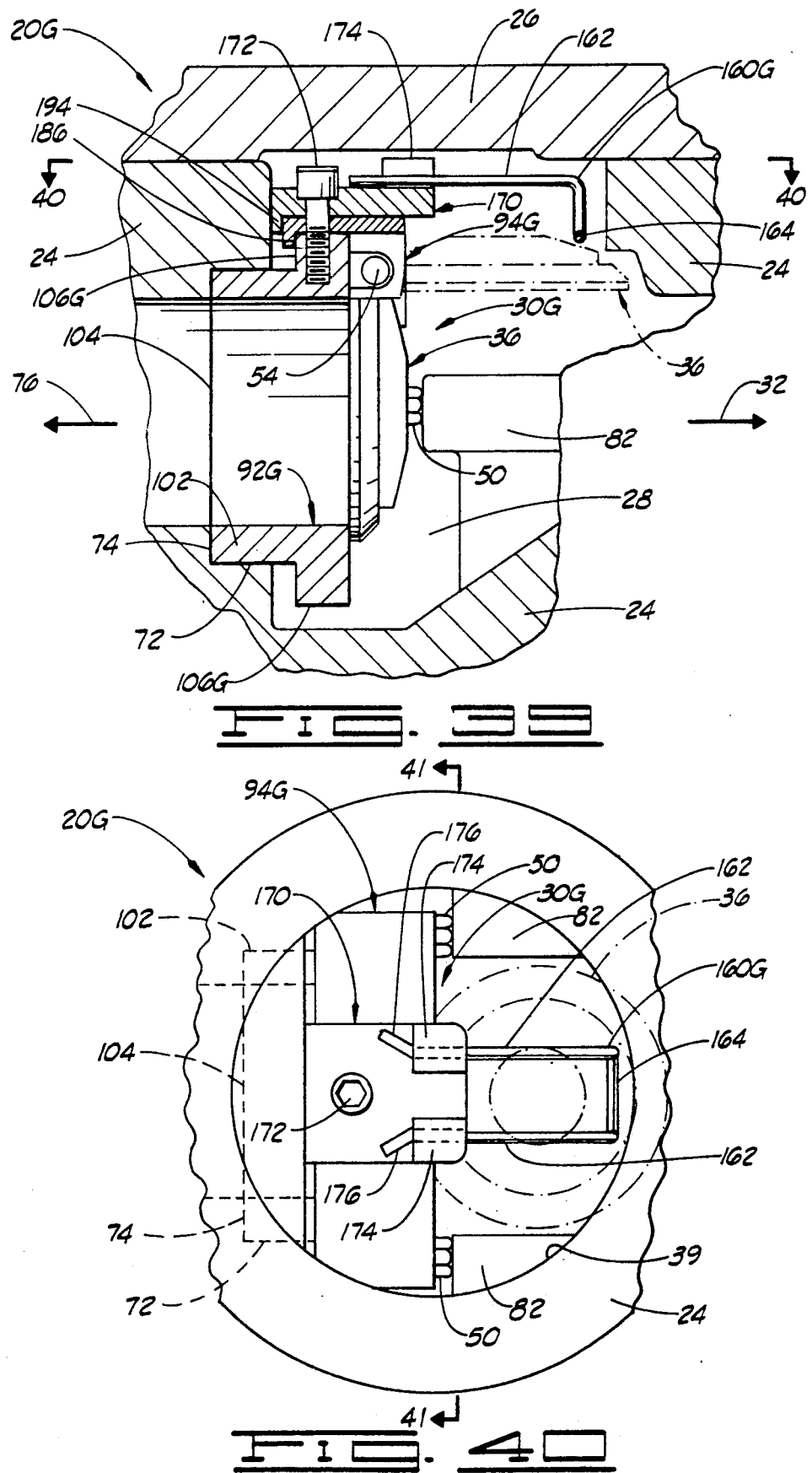

TOP-ENTRY CHECK VALVE WITH CARTRIDGE SECURED BY THREADED PROJECTIONS

CROSS REFERENCE TO RELATED APPLICATIONS

This application is related to the following applications filed on an even date herewith:
Top-Entry Check Valve Having Retainer Ring, Ser. No. 762,104.
Top-Entry Check Valve With Threaded Fasteners, Ser. No. 762,540.
Top-Entry Check Valve With Screw-In Seat, Ser. No. 762,514.
Top-Entry Check Valve Having Spring Retainer, Ser. No. 762,517.
Top-Entry Check Valve With Cartridge Secured By Projections, Ser. No. 761,594.
Top-Entry Check Valve With Pin Fasteners, Ser. No. 762,539.

FIELD OF THE INVENTION

This invention relates to improvements in top-entry swing check valves.

SUMMARY OF THE INVENTION

The present invention provides a top-entry check valve with a smooth, straight chamber which minimizes both turbulence and pressure drop of the fluid passing through the valve. The relatively small cavity of this design allows an overall reduction in size and weight over conventional top-entry check valves.

The cartridge assembly of the valve includes a seat, a cage and a disc. The seat and cage may be a unitary structure in order to make replacement of the seat and cage more easily accomplished.

A removable bonnet is attached over the access opening to the valve chamber. With the bonnet detached, the seat, cage and disc can readily be replaced.

An annular shoulder in the valve chamber prevents the valve cartridge from moving in an upstream direction. Threaded projections extend downstream from the valve cartridge assembly and engage the valve body to limit downstream movement of the valve cartridge assembly.

Additional advantages and features will become apparent from the detailed description of the preferred embodiments of the invention when read in conjunction with the drawings and appended claims.

BRIEF DESCRIPTION OF THE DRAWINGS

FIG. 1 is a vertical cross-sectional view of a prior art top-entry check valve with turbulent flow.

FIG. 2 is a vertical cross-sectional view of a top-entry check valve constructed in accordance with the present invention and illustrating the smooth flow through the valve chamber.

FIG. 3 is a side elevation of a top-entry check valve constructed in accordance with the present invention with a prior art top-entry check valve shown in outline to illustrate the improved dimensions of the present invention.

FIG. 4 is a vertical cross-sectional view of a portion of a top-entry check valve constructed in accordance with the present invention.

FIG. 5 is a cross-sectional view taken along lines 5—5 of FIG. 4.

FIG. 6 is a cross-sectional view taken along lines 6—6 of FIG. 5.

FIG. 7 is an elevational view of the unitary seat and cage of valve of FIGS. 4, 5 and 6 from the downstream side.

FIG. 8 is a side elevation of the unitary seat and cage of FIG. 7.

FIG. 9 is an elevational view of the unitary seat and cage of FIG. 7 from the upstream side.

FIG. 15 is a side elevation of the seat of the valve of FIGS. 13 and 14.

FIG. 16 is an elevational view of the seat of FIG. 15 from the downstream side.

FIG. 17 is a side elevation of the cage of the valve of FIGS. 13 and 14.

FIG. 18 is an elevational view of the cage of FIG. 17 from the downstream side.

FIG. 19 is a vertical cross-sectional view of a portion of another form of top-entry check valve constructed in accordance with the present invention.

FIG. 20 is a cross-sectional view taken along lines 20—20 of FIG. 19.

FIG. 21 is a side elevation of the cage of the valve of FIGS. 19 and 20.

FIG. 28 is a vertical cross-sectional view of a portion of another form of top-entry check valve constructed in accordance with the present invention.

FIG. 29 is a cross-sectional view taken along lines 29—29 of FIG. 28.

FIG. 30 is a side elevation of the cage of the valve of FIG. 28.

FIG. 31 is a vertical cross-sectional view of a portion of another form of top-entry check valve constructed in accordance with the present invention.

FIG. 32 is a cross-sectional view taken along lines 32—32 of FIG. 31.

FIG. 33 is a cross-sectional view taken along lines 33—33 of FIG. 32.

FIG. 34 is an elevational view of the unitary seat and cage of FIG. 31 from the downstream side.

FIG. 35 is a side elevation of the unitary seat and cage of FIG. 34.

FIG. 36 is an elevational view of the unitary seat and cage of FIG. 34 from the upstream side.

FIG. 39 is a vertical cross-sectional view of a portion of another form of top-entry check valve constructed in accordance with the present invention.

FIG. 40 is a cross-sectional view taken along lines 40—40 of FIG. 39.

FIG. 46 is an exploded elevational view of the cage and cushion spring support of FIG. 44 from the upstream side.

DETAILED DESCRIPTION OF THE PREFERRED EMBODIMENTS

Figure 10:
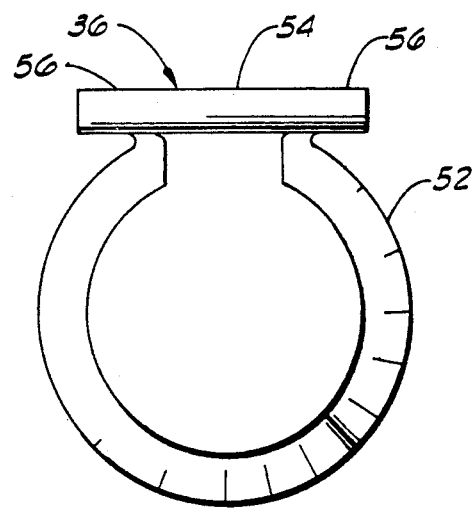
FIG. 10 is an elevational view of the disc of the valve of FIGS. 4, 5 and 6 from the downstream side.

Referring now to the drawings in detail, and to FIG. 1 in particular, the reference numeral 10 generally designates a prior ar top-entry check valve. Flow into the valve 10 is indicated by the straight arrows 11. As illustrated by the swirling arrows 12, turbulent flow is created by the high bonnet 14 and large cavity 16. This construction requires machining inside the valve body for the hinge 18 and valve seat 19.

FIG. 2 illustrates a typical top-entry check valve 20 constructed in accordance with the present invention. Flow into the valve 20 is designated by the straight arrows 21. The arrows 22 illustrate the smooth, even flow through valve 20. The improved flow is a result of the relatively straight lines of the valve body 24. The bonnet 26 forms the top wall of the valve chamber 28, such that there is virtually no cavity between the bonnet and the valve chamber, as contrasted with the existence of a cavity 16 in the prior art valve 10. The distance from the center-line 27 of the body 24 to the bottom of the bonnet 26 is approximately the same as the distance from the center-line to the bottom of the valve chamber.

FIG. 3 is a comparison of a conventional, prior art top-entry check valve 10 (partially in outline) and a check valve 20 constructed in accordance with the present invention (shown in full lines). This comparison illustrates the reduction in size and weight accomplished by the present invention. The drawing also shows the use of flanges 29 at the upstream and downstream ends of the valve 20, although it will be understood that the valve body 24 can be fitted with any desired connecting arrangement.

It will also be understood that the following embodiments include the use of standard seals, such as elastomeric O-ring seals, to provide fluid-tight engagement between various surfaces. Such seals are installed in a conventional manner where needed to prevent leakage of fluid between the valve components. These seals are omitted from the drawings in order to illustrate more clearly the preferred embodiments of the present invention.

EMBODIMENT OF FIGS. 4 THROUGH 12

In FIGS. 4, 5 and 6, the central portion of a valve 20 constructed in accordance with the present invention is shown enlarged. As shown in these figures, the valve chamber 28 receives a valve cartridge assembly, generally designated by reference character 30. The valve cartridge assembly 30 controls the flow of fluid through the valve 20. The valve cartridge assembly 30 basically comprises a unitary seat and cage member 34 and a valve disc 36 supported on the member 34. As best shown in FIG. 5, an access opening 39 allows installation and removal of the valve cartridge assembly 30, when the bonnet 26 is detached from the valve body 24.

The unitary seat and cage 34 of the valve 20 is shown separately in FIGS. 7, 8 and 9. The seat/cage 34 is generally circular with a flow opening 42 therethrough. An annular seating face 44 around the flow opening 42 is sized and shaped to mate with the disc 36. A pair of hinge pin supports 46 extend generally radially in the seat/cage 34 to suspend the disc 36 in the valve cartridge assembly 30. As best shown in FIG. 8, a reduced diameter extension 47 is formed on the upstream end 48 of the unitary seat and cage member 34 and an annular shoulder 49 extends around the unitary seat and cage member 34. FIG. 8 also illustrates that the hinge pin supports 46 are generally U-shaped in cross-section. A pair of threaded projections 50 extend downstream from the unitary seat and cage 34. Each threaded projection 50 screws into a threaded hole formed in the annular shoulder 49 of the unitary seat and cage 34. As illustrated by FIGS. 7 and 9, the annular shoulder 49 has a flattened top surface 51 between the hinge pin supports 46.

Figure 11:
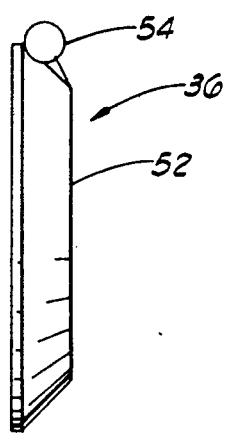
FIG. 11 is a side elevation of the disc of FIG. 10.
Figure 12:
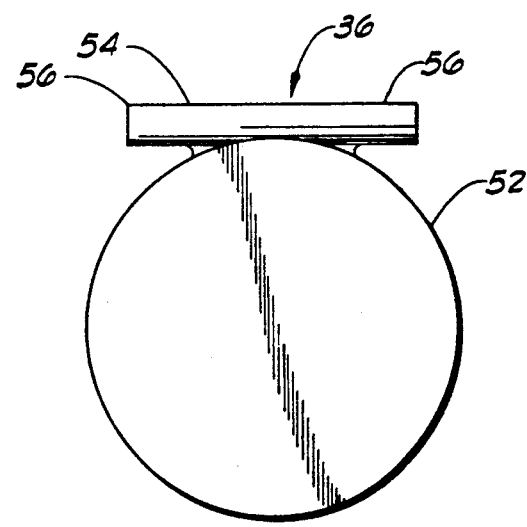
FIG. 12 is an elevational view of the disc of FIG. 10 from the upstream side.

The disc 36 of the valve 20 is shown separately in FIGS. 10, 11 and 12. The disc 36 is a generally circular flat plate 52. At least one hinge pin 54, with end portions 56, extends at a tangent from the plate 52. As discussed hereinafter, the end portions 56 of the hinge pin 54 pivotally support the disc 36 within the valve 20.

The arrangement of the valve cartridge assembly 30 in the valve chamber 28 is disclosed in FIGS. 4, 5 and 6. As described hereinabove, the valve cartridge assembly 30 comprises the unitary seat and cage member 34 and the valve disc 36. The reduced diameter extension 47 of the seat and cage 34 fits into a mating counterbore 72 in the valve body 24. The counterbore 72 forms an annular shoulder 74 facing downstream to mate with the upstream end 48 of the seat/cage 34. This arrangement prevents movement of the valve cartridge assembly 30 in the upstream direction indicated by arrow 76.

As best illustrated by FIG. 4, the hinge pin supports 46 of the unitary seat and cage member 34 cradle the end portions 56 of the hinge pin 54 of the disc 36 to suspend the disc 36 within the valve cartridge assembly 30. The disc 36 pivots about the axis of the hinge pin 54 to close against the seating face 44 of the unitary seat and cage member 34 and prevent flow through the valve cartridge assembly 30 in the upstream direction 76. Conversely, the disc 36 pivots about the axis of the hinge pin 54 to open away from the seating face 44 of the unitary seat and cage 34 and allow unobstructed flow through the valve cartridge assembly 30 in the downstream direction 32.

As best shown in FIGS. 4 and 5, each threaded projection 50 extends downstream from the unitary seat and cage 34 to engage a lug 82 formed in the valve body 24. This arrangement prevents movement of the valve cartridge assembly 30 in the downstream direction 32. As illustrated by FIG. 4, the hinge pin supports 46 of the seat and cage 34 are bent over to trap the hinge pin 54 of the disc 36 within the hinge pin supports 46 and to keep the disc 36 from being dislodged from the unitary seat and cage 34. The cross-sections of the hinge pin supports 46 are larger than the diameter of the hinge pin 54 and allow the disc 36 to float in the upstream 76 and downstream 32 directions in a near-closed position. This "float" of the disc 36 minimizes damage and wear on the hinge pin 54, hinge pin supports 46 and disc 36.

As best shown in FIG. 5, the valve cartridge assembly 30 is readily accessible with the bonnet 26 detached. To remove the valve cartridge assembly 30, the threaded projections 50 are screwed into the unitary seat and cage 34 to provide space between the threaded projections 50 and the lugs 82. The valve cartridge assembly 30 may be forced downstream until the reduced diameter extension 47 is out of the counterbore 72 by screwing the projections 50 against the wall of the valve chamber 28 adjacent the counterbore 72. The valve cartridge assembly 30 is then removed from the valve chamber 28 through the access opening 39.

To install the valve cartridge assembly 30 in the valve chamber 28, the threaded projections are screwed into the unitary seat and cage 34. The valve cartridge assembly 30 is inserted through the access opening 39 into the valve chamber 28 and pushed upstream until the reduced diameter extension 47 is in the mating counterbore 72. Each threaded projection 50 is then partially unscrewed from the seat and cage 34 until the threaded projection 50 engages one of the lugs 82 in the valve body 24. The bonnet 26 is attached to complete the installation. When attached over the access opening 39, the bonnet 26 engages the flat top surface 51 of the seat and cage 34 to prevent transverse rotation of the valve cartridge assembly 30 within the valve chamber 28.

The disc 36 can be separated from the unitary seat and cage 34 by bending the hinge pin supports 46 to free the hinge pin 54 of the disc 36 from the hinge pin supports 46. Another disc 36 can be installed in the seat and cage 34 by positioning the end portions 56 of the hinge pin 54 of the disc 36 in the hinge pin supports 46 and bending the hinge pin supports 46 over to trap the hinge pin 54 within the hinge pin supports 46. This construction permits easy replacement of the seat/cage 34 or disc 36 individually, or of the valve cartridge assembly 30 as a unit.

EMBODIMENT OF FIGS. 13 THROUGH 18

Figure 13:
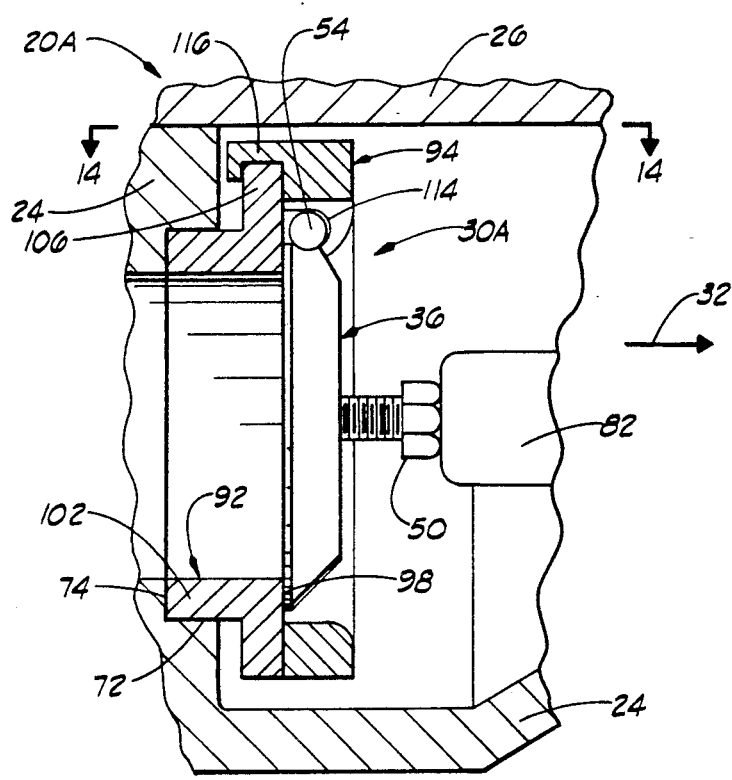
FIG. 13 is a vertical cross-sectional view of a portion of another form of top-entry check valve constructed in accordance with the present invention.
Figure 14:
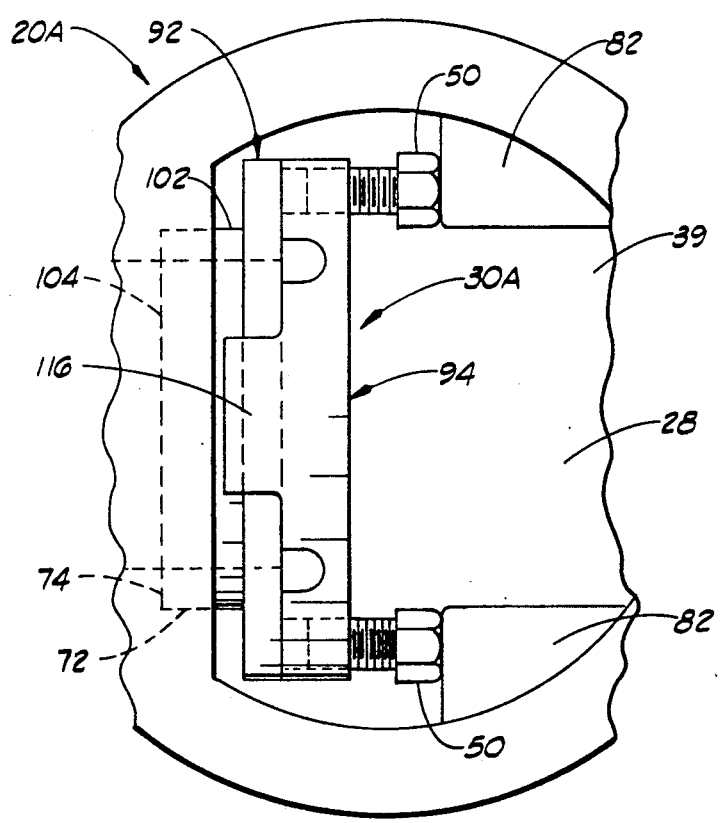
FIG. 14 is a cross-sectional view taken along lines 14—14 of FIG. 13.

Referring now to FIGS. 13 and 14, reference character 20A designates another form of a valve constructed in accordance with the present invention. This particular embodiment utilizes the valve cartridge assembly 30A comprising a separate seat 92 and cage 94 with the valve disc 36. As best shown in FIG. 14, the pair of threaded projections 50 extend downstream from the cage 94.

FIGS. 15 and 16 illustrate the structure of the separate seat 92. The seat 92 is generally circular with a flow opening 96 therethrough. An annular seating face 98 around the flow opening 96 is sized and shaped to mate with the disc 36. As best shown in FIG. 15, a reduced diameter extension 102 is formed on the upstream end 104 of the seat 92 and an annular shoulder 106 extends around the seat 92.

The cage 94 is shown separately in FIGS. 17 and 18. The cage 94 is generally circular with a flow opening 112 therethrough. The pair of threaded projections 50 screw into threaded holes in the cage 94 and extend downstream from the cage 94. A pair of hinge pin supports 114 are formed in the cage 94. As best shown in FIG. 17, the hinge pin supports are U-shaped in cross-section and face upstream. An upstream extension 116, sized and shaped to mate with the annular shoulder 106 of the seat 92 is formed at the top center portion of the cage 94. The downstream side of the cage 94 has a cut-out 118 between the hinge pin supports 114.

The arrangement of the valve cartridge assembly 30A in the valve chamber 28 is disclosed in FIGS. 13 and 14. As described hereinabove, the valve cartridge assembly 30A comprises the seat 92, the cage 94 and the valve disc 36. The reduced diameter extension 102 of the seat 92 fits into the mating counterbore 72 of the valve body 24. The annular shoulder 74 engages the upstream end 104 of the seat 92 to prevent movement of the valve cartridge assembly 30A in the upstream direction 76.

As best illustrated by FIG. 13, the hinge pin supports 114 of the cage 94 cradle the end portions 56 of the hinge pin 54 of the disc 36 to suspend the disc 36 within the valve cartridge assembly 30A. The disc 36 pivots about the axis of the hinge pin 54 to close against the seating face 98 of the seat 92 and prevent flow through the valve cartridge assembly 30A in the upstream direction 76. Conversely, the disc 36 pivots about the axis of the hinge pin 54 to open away from the seating face 98 of the seat 92 and allow unobstructed flow through the valve cartridge assembly 30A in the downstream direction 32. The cut-out 118 of the cage 94 prevents the cage 94 from interfering with the disc 36 as the disc 36 pivots away from the seating face 98 to allow unobstructed flow through the valve cartridge assembly 30A.

The hinge pin supports 114 are larger than the diameter of the hinge pin 54 and allow the disc 36 to float in the upstream 76 and downstream 32 directions in a near-closed position. This "float" of the disc 36 minimizes damage and wear on the hinge pin 54, hinge pin supports 114 and disc 36.

The upstream extension 116 of the cage 94 fits over the annular shoulder 106 of the seat 92 to connect the seat 92 and the cage 94. As best shown in FIG. 13, the downstream side of the seat 92 traps the hinge pin 54 of the disc 36 within the hinge pin supports 114 of the cage 94. This arrangement keeps the disc 36 from being dislodged from the cage 94.

As illustrated by FIG. 14, the valve cartridge assembly 30A is readily accessible with the bonnet 26 detached. The valve cartridge assembly 30A is installed and removed by screwing and partially unscrewing the threaded projections 50 as described hereinabove. It will be appreciated that the seat 92, the cage 94 and the disc 36 can be replaced separately or as a unit.

EMBODIMENT OF FIGS. 19, 20 AND 21

Referring now to FIGS. 19 and 20, reference character 20B designates another form of a valve constructed in accordance with the present invention. This particular embodiment utilizes the valve cartridge assembly 30B comprising the seat 92, the modified cage 94B and the valve disc 36. The cage 94B is modified with respect to a downstream extension 122 having a cushion 124. The cushion 124 may be made of an elastomeric material.

The cage 94B of the valve 20B is shown separately in FIG. 21. The cage 94B is identical to the cage 94, except that the cage 94B has the downstream extension 122. The cushion 124 is secured to the downstream extension 122 and protrudes from the underside 126 of the downstream extension 122.

The arrangement of the valve cartridge assembly 30B in the valve chamber 28 is disclosed in FIGS. 19 and 20. As best shown in FIG. 19, the disc 36 strikes the cushion 124 before reaching the extension 122, the bonnet 26 or the valve body 24 when the disc 36 pivots away from the seating face 98. The disc 36 having pivoted into contact with the cushion 124 is shown in phantom in FIG. 19. The cushion 124 absorbs shock from a forceful opening of the disc 36 to reduce wear on the disc 36, the cage 94, the valve body 24 and the bonnet 26. This construction prolongs the useful life of the disc 36 and the valve 20B in general.

As illustrated by FIG. 20, the valve cartridge assembly 30B is readily accessible with the bonnet 26 detached. The valve cartridge assembly 30B is installed in and removed from the valve chamber 28 in the same manner as described hereinabove. It will be appreciated that the access opening 39 should be large enough to accommodate the insertion and extraction of the valve cartridge assembly 30B with the downstream extension 122 of the cage 94B.

EMBODIMENT OF FIGS. 22 THROUGH 27

Figure 22:
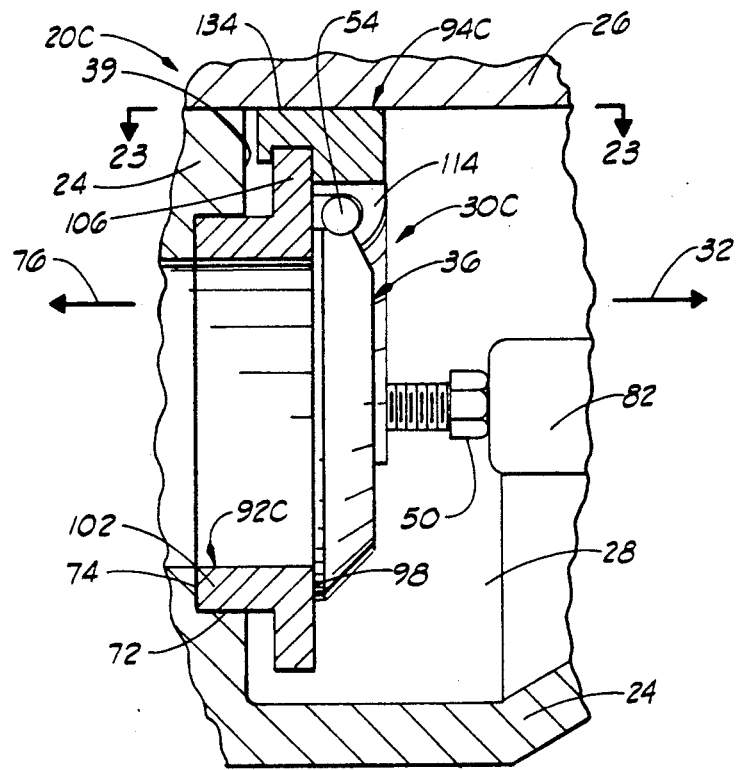
FIG. 22 is a vertical cross-sectional view of a portion of another form of top-entry check valve constructed in accordance with the present invention.
Figure 23:
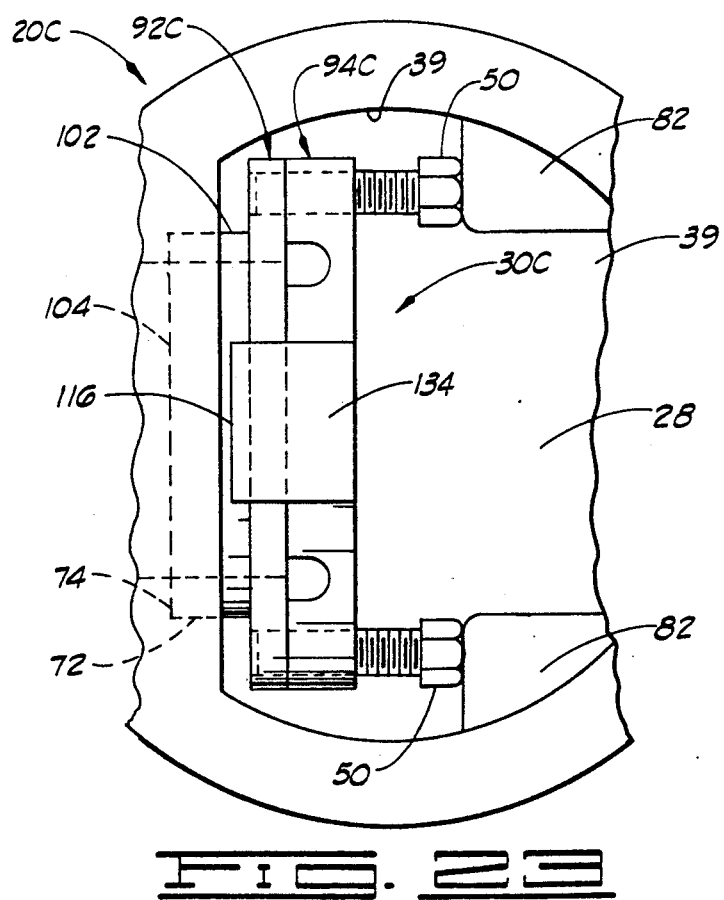
FIG. 23 is a cross-sectional view taken along lines 23—23 of FIG. 22.

Referring now to FIGS. 22 and 23, reference character 20C designates yet another form of a valve constructed in accordance with the present invention. This particular embodiment utilizes the valve cartridge assembly 30C comprising the modified seat 92C, the modified cage 94C and the valve disc 36. As best shown in FIG. 23, each threaded projection 50 extends downstream from the seat 92C through the cage 94C.

Figures 24, 25:
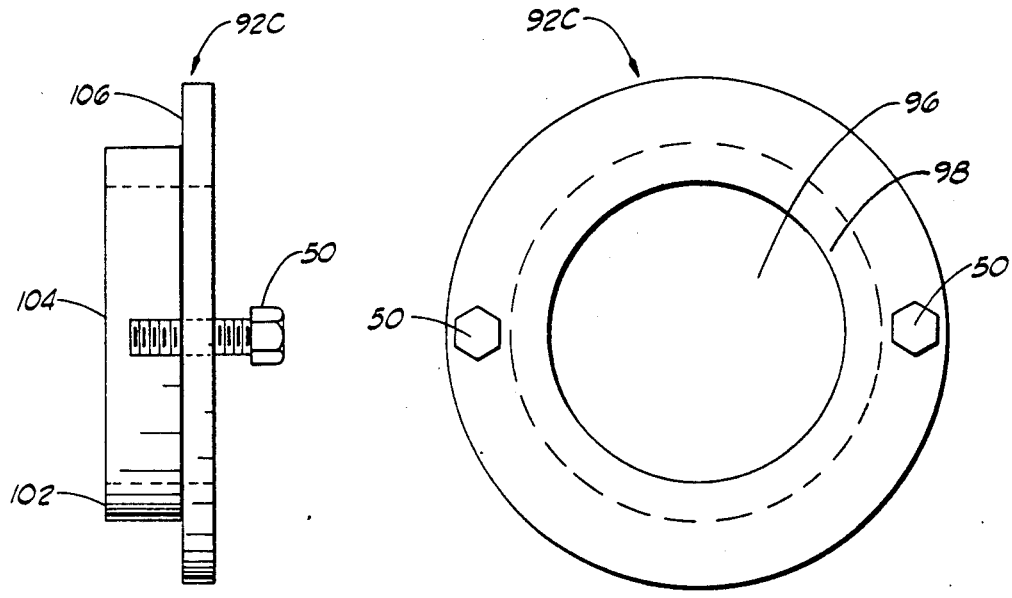
FIG. 24 is a side elevation of the seat of the valve of FIGS. 22 and 23.
FIG. 25 is an elevational view of the seat of FIG. 24 from the downstream side.

The seat 92C of the valve 20C is shown separately in FIGS. 24 and 25. The seat 92C is identical to the seat 92, except that the seat 92C has the pair of threaded projections 50 extending downstream from the seat 92C. Each threaded projection 50 screws into a threaded hole through the annular shoulder 106 of the seat 92C.

Figures 26, 27:
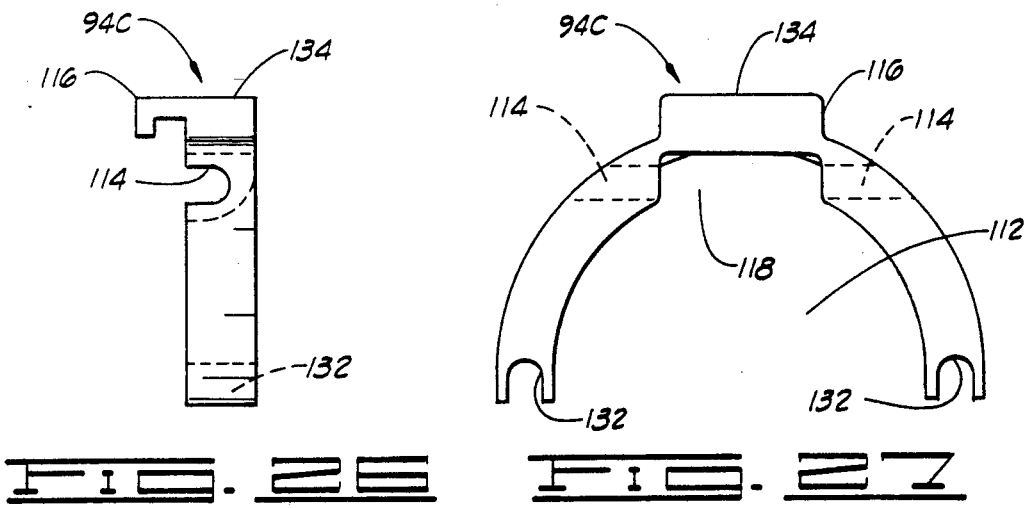
FIG. 26 is a side elevation of the cage of the valve of FIGS. 22 and 23.
FIG. 27 is an elevational view of the cage of FIG. 26 from the downstream side.

The cage 94C of the valve 20C is separately illustrated in FIGS. 26 and 27. The cage 94C is like the cage 94, but the cage 94C is generally semi-circular rather than circular. Each end of the semi-circle is formed with a U-shaped slot 132. In addition, the upstream extension 116 has a flat top surface 134.

The arrangement of the valve cartridge assembly 30C in the valve chamber 28 is disclosed in FIGS. 22 and 23. As described hereinabove, the valve cartridge assembly 30C comprises the seat 92C, the cage 94C and the valve disc 36. Each threaded projection 50 extends downstream from the seat 92C, through the respective U-shaped slot 132 of the cage 92C, and engages the corresponding lug 82 of the valve body 24. The engagement of the threaded projections 50 with the lugs 82 prevents movement of the valve cartridge assembly 30C in the downstream direction 32. As illustrated by FIG. 22, the attached bonnet 26 abuts the flat top surface 134 of the cage 94C to prevent transverse rotation of the valve cartridge assembly 30C within the valve chamber 28.

As best shown in FIG. 23, the valve cartridge assembly 30C is readily accessible with the bonnet 26 detached. The valve cartridge assembly 30C is installed in and removed from the valve chamber 28 in the manner described hereinabove. In this particular embodiment, however, the U-shaped slots 132 of the cage 94C merely fit over the threaded projections 50 and the cage 94C with the disc 36 can be replaced through the access opening 39 without disturbing the seat 92C. As in the valve 20 embodiment, the projections 50 may be screwed against the wall of the valve chamber 28 to force, or jack, the valve seat extension 102 out of the counterbore 72.

EMBODIMENT OF FIGS 28 THROUGH 30

Referring now to FIGS. 28 and 29, reference character 20D designates still another form of a valve constructed in accordance with the present invention. This particular embodiment utilizes the valve cartridge assembly 30D, comprising the seat 92C, the modified cage 94D and the valve disc 36. The cage 94D is modified to have the downstream extension 122 with the cushion 124.

The cage 94D of the valve 20D is shown separately in FIG. 30. The cage 94D is identical to the cage 94C, except that the cage 94D has the downstream extension 122 with the cushion 124.

The arrangement of the valve cartridge assembly 30D in the valve chamber 28 is disclosed in FIGS. 28 and 29. The function of the downstream extension 122 and cushion 124 is the same as disclosed hereinabove. The valve cartridge assembly 30D is secured against upstream 76 and downstream 32 movement in the same manner as described hereinabove. As best shown in FIG. 28, the attached bonnet 26 abuts the flat top surface of the cage 94D to prevent transverse rotation of valve cartridge assembly 20D.

As best shown in FIG. 29, the valve cartridge assembly 30D is readily accessible with the bonnet 26 detached. The valve cartridge assembly 30D is installed into and removed from the valve chamber 28 according to procedures described hereinabove. It will be appreciated that the access opening 39 should be shaped and sized to accommodate the replacement of the cage 94D with the downstream extension 122 and that the cage 94D with the disc 36 can be replaced without disturbing the valve seat 92C.

EMBODIMENT OF FIGS. 31 THROUGH 36

Referring now to FIG. 31, reference character 20E designates another form of valve constructed in accordance with the present invention. This particular embodiment utilizes the modified unitary seat and cage 34E and the modified valve body 24E.

As best shown in FIG. 31, the valve body 24E has two modifications of the valve body 24. First, the mating counterbore 72 is eliminated. Instead of the mating counterbore 72, the valve body 24E has a downstream facing surface 142 which engages the upstream end 48E of the unitary seat and cage 34E.

The second modification in the valve body 24E is the addition of a positioning lug 144 in order to align the unitary seat and cage member 34E within the valve chamber 28. As illustrated by FIGS. 31 and 33, the positioning lug 144 protrudes from the valve body 24E into the valve chamber 28 to support the unitary seat and cage 34E. Resting on the positioning lug 144, the valve cartridge assembly 30E is aligned for the disc 36 to prevent flow through the valve chamber 28 in the upstream direction 76.

As shown in FIGS. 31 and 32, the unitary seat and cage 34E has no reduced diameter extension 47 in the upstream direction. The upstream end 48E of the unitary seat and cage 34E is an annular surface which engages the downstream face 142 of the valve body 24E. This engagement of the downstream face 142 of the valve body 24E with the upstream end 48E of the seat and cage 34E prevents the valve cartridge assembly 30E, comprising the seat/cage 34E and the disc 36, from movement in the upstream direction 76.

The unitary seat and cage 34E is shown separately in FIGS. 34, 35 and 36. As shown in these figures, the seat and cage 34E is exactly like the seat/cage 34 except that the reduced diameter extension 47 is eliminated from the seat and cage 34E.

EMBODIMENT OF FIGS. 37 AND 38

Figure 37:
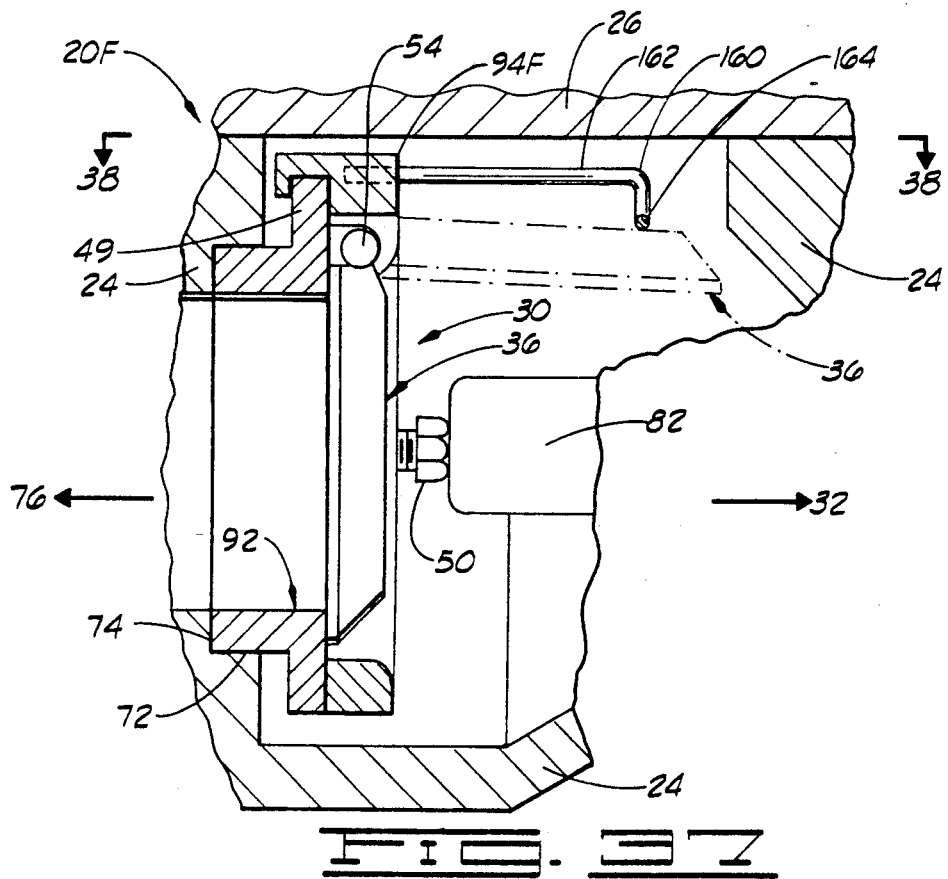
FIG. 37 is a vertical cross-sectional view of a portion of another form of top-entry check valve constructed in accordance with the present invention.

Referring now to FIG. 37, reference character 20F designates a portion of another top-entry check valve constructed in accordance with the present invention. This particular embodiment utilizes the cage 94F, which is a modification of the cage 94.

As shown in FIG. 37, the cage 94F includes a cushion spring 160 extending from the downstream end of the cage 94F. When the disc 36 opens rapidly, as indicated by the phantom lines, the disc 36 strikes the cushion spring 160 before the disc 36 reaches the bonnet 26 or the valve body 24. The cushion spring 160 absorbs the impact of the disc 36 when the disc 36 opens quickly to allow fluid flow in the downstream direction 32. By preventing forceful impact of the disc 36 with the bonnet 26 and the valve body 24, the cushion spring 160 reduces wear and prolongs the useful life of the disc 36, bonnet 26 and valve body 24.

Figure 38:
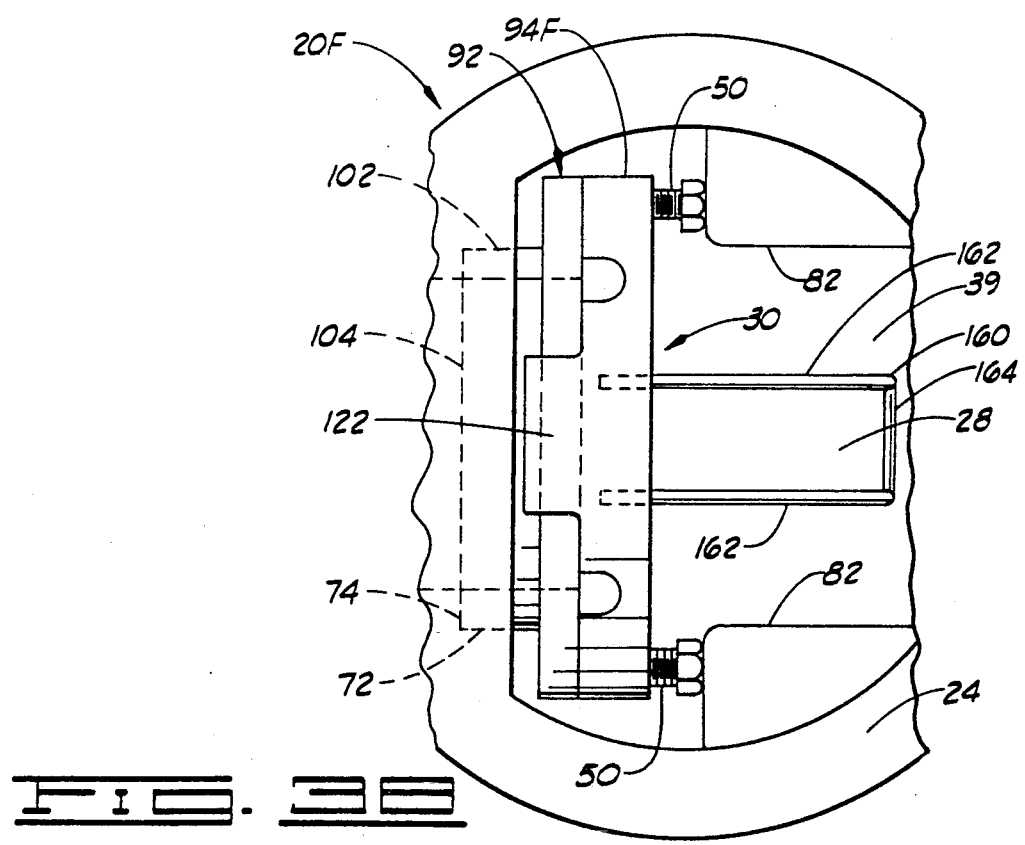
FIG. 38 is a cross-sectional view taken along lines 38—38 of FIG. 37.

As illustrated by FIGS. 37 and 38, the cage 94F is exactly like the cage 94, except that the cage 94F further comprises the cushion spring 160. As best shown in FIG. 38, the cushion spring 160 is generally U-shaped and includes a pair of substantially parallel legs 162 joined by a transverse leg 164. As FIG. 37 illustrates, at least a portion of each parallel leg 162 is bent down so that the opening disc 36 makes contact with the transverse leg 164 before striking any other surface.

EMBODIMENT OF FIGS. 39 THROUGH 46

Referring now to FIG. 39, reference character 20G designates another form of a valve constructed in accordance with the present invention. This particular embodiment utilizes the modified seat 92G and the modified cage 94G with a cushion spring support 170 and a cushion spring 160G.

As best shown in FIG. 39, the cushion spring support 170 and cage 94G are secured to the annular shoulder 106G of the seat 92G by a bolt 172. The cushion spring 160G extends downstream from the cushion spring support 170 to meet the opening disc 36 (in phantom lines) before the disc 36 can strike the valve body 24 or bonnet 26.

Figure 41:
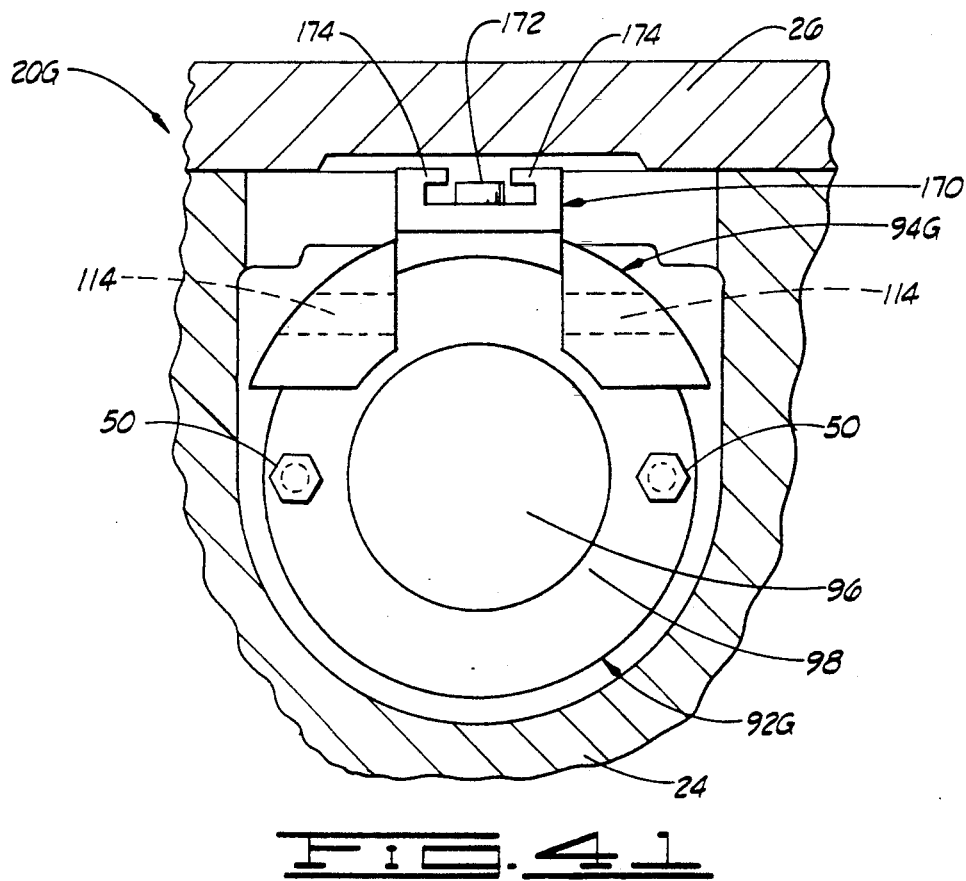
FIG. 41 is a cross-sectional view taken along lines 41—41 of FIG. 40. The cushion spring and the disc are not shown for purposes of illustration.

As FIG. 40 illustrates, the cushion spring support 170 includes a pair of cushion spring holders 174 at the downstream end of the cushion spring support 170. As best shown in FIG. 41 (the cushion spring 160G and disc 36 are not shown in this figure for clarity), the cushion spring holders 174 are generally U-shaped in cross-section and are located at the lateral sides of the upper surface of the cushion spring support 170 with the open ends of the U-shapes facing each other. As FIG. 40 illustrates, each lateral leg 162 of the cushion spring 160G fits into the U-shape of the corresponding cushion spring holder 174. The cushion spring 160G is normally biased for pushing the lateral legs 162 of the cushion spring 160G outward into the U-shape of the cushion spring holders 174 to keep the cushion spring 160G within the cushion spring holders 174. As best shown in FIG. 40, a portion of the upstream end 176 of each lateral leg 162 of the cushion spring 160G is bent outward to prevent the cushion spring 160G from being dislodged from the cushion spring holders 174 in the downstream direction 32.

Figures 42, 43:
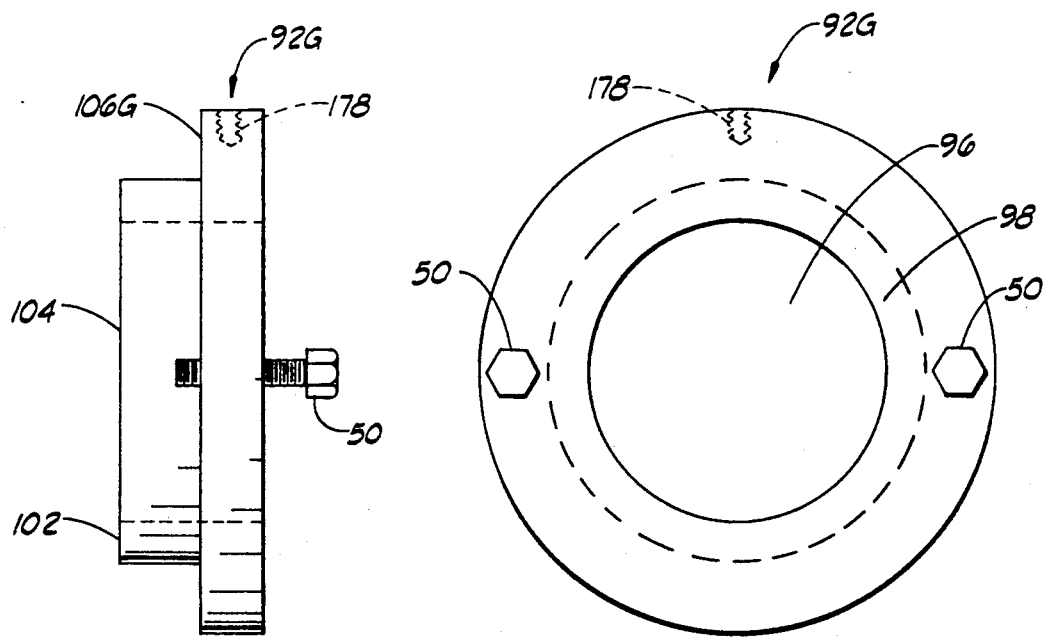
FIG. 42 is a side elevation of the seat of FIG. 39.
FIG. 43 is an elevational view of the seat of FIG. 41 from the downstream side.

FIGS. 42 and 43 show the seat 92G separately. The seat 92G is exactly like the seat 92C except that the top of the annular shoulder 106G has a threaded bolt-hole 178 for securing the cage 94G and cushion spring support 170 with the bolt 172.

Figure 44:
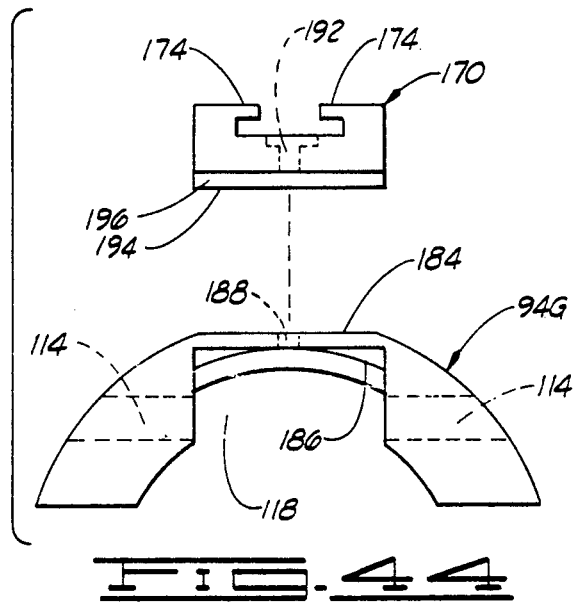
FIG. 44 is an exploded elevational view of the cage and cushion spring support of FIG. 39 from the downstream side.
Figure 45:
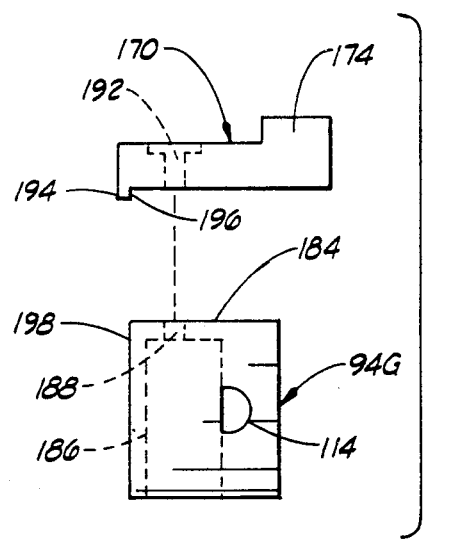
FIG. 45 is an exploded side elevation of the cage and cushion spring support of FIG. 44.
Figure 45:
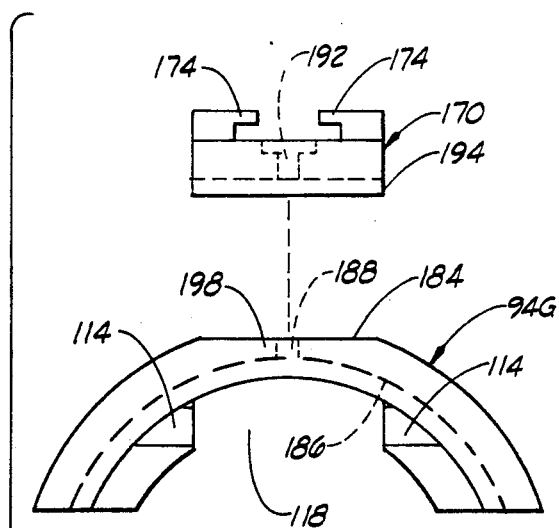

FIGS. 44 through 46 show the cage 94G and cushion spring support 170 separately. The cage 94G is similar to the cage 94C in at least two respects. The hinge pin supports 114 of the cage 94G are generally U-shaped in cross-section and face upstream. The cage 94G also has the downstream cut-out 118 to allow the disc 36 to pivot freely to the open position. The cage 94G is, however, a significant modification of the cage 94C. The cage 94G is generally in the shape of a partial circle with a flat upper surface 184 for the attachment of the cushion spring support 170. An arcuate recess 186 is formed in the inner surface of the cage 94G. The arcuate recess 186 is shaped to mate with the annular shoulder 106G of the seat 92G. A hole 188 extends from the upper surface 184 of the cage 94G through to the arcuate recess 186. The hole 188 is positioned to align with the bolt-hole 178 in the annular shoulder 106G of the seat 92G.

Continuing to refer to FIGS. 44 through 46, the cushion spring support 170 is shaped to fit upon the upper surface 184 of the cage 94G. The cushion spring support 170 includes a hole 192 which aligns, when assembled, with the hole 188 through the cage 94G and the bolt-hole 178 of the seat 92G. As best shown in FIG. 45, the upstream end of the cushion spring support 170 includes a lip 194 with a downstream face 196 to overhang the cage 94G when installed. When the cushion spring support 170 is attached to the cage 94G, the downstream face 196 of the lip 194 engages the upper upstream face 198 of the cage 94G to keep the cushion spring support 170 from rotating out of position on the upper surface 184 of the cage 94G.

The valve cartridge assembly 30G, which includes the seat 92G, the cage 94G, the disc 36 and the cushion spring support 170 with the cushion spring 160G, is easily installed in the valve chamber 28 with the bonnet 26 detached. As illustrated by FIGS. 39 and 40, the seat 92G is installed with the reduced diameter extension 102 inside the mating counterbore 72 of the valve body 24. The bolts 50 are screwed into the seat 92G or the seat 92G is rotated to allow the bolts 50 to be clear of the lugs 82 as the seat 92G is inserted into the valve chamber 28. The seat 92G is moved in the upstream direction 76 until the reduce diameter extension 102 is within the mating counterbore 72. The bolts 50 are partially unscrewed to cooperate with the lugs 82 in the valve body 24 to prevent movement of the valve cartridge assembly 30G in the downstream direction 32. With the seat 92G installed, the cage 94G can merely be slipped over the seat 92G, the arcuate recess 186 of the cage 92G fitting with the annular shoulder 106G of the seat 92G. The cushion spring support 170 with the cushion spring 160G and the cage 94G are then bolted to the seat 92G. Removal of the valve cartridge assembly 30G from the valve chamber 28 is accomplished by generally reversing the installation procedure.

With this arrangement the cage 94G, the cushion spring support 170 and cushion spring 160G can be replaced without disturbing the seat 92G. Moreover, the cushion spring 160G can be replaced without disturbing the cushion spring support 170, the cage 94G, the disc 36 or the seat 92G. The cushion spring 160G is removed from the cushion spring support 170 by compressing the lateral legs 162 toward each other to overcome the bias of the cushion spring 160G and free the lateral legs 162 from the cushion spring holders 174. The cushion spring 160G can then be lifted from the cushion spring support 170. The cushion spring 160G is installed by squeezing the lateral legs 162 toward each other and releasing each lateral leg 162 into the corresponding cushion spring holder 174. Easy replacement of the cushion spring 160G is an important advantage when it is necessary to replace a worn cushion spring 160G or to install a more resilient or less resilient cushion spring 160G.

Changes may be made in the combinations, operations and arrangements of the various parts and elements described herein without departing from the spirit and scope of the invention as defined in the following claims.

What is claimed is:

1. A top entry check valve, comprising:
   a valve cartridge assembly, including a seat, cage and disc;
   a body having upstream and downstream ends, a valve chamber therein communicating with the upstream and downstream ends thereof, and an access opening in a side wall thereof communicating with the valve chamber of a size to accommodate the entry and removal of the valve cartridge assembly therethrough, said body also having an annular shoulder therein facing downstream sized to engage and prevent the valve cartridge from moving upstream;
   a bonnet removably attached to the body over said access opening forming a wall of the valve chamber; and
   projection means threadedly secured to the cartridge assembly and extending radially therefrom downstream from the cartridge assembly into adjustable engagement with abutment surfaces extending from at least one interior wall of the valve chamber downstream of the cartridge assembly for removably securing the cartridge assembly within the valve chamber through the access opening as a single unit and limiting the downstream movement of the cartridge assembly within the valve chamber.

2. A valve as defined in claim 1 wherein the disc is a generally circular flat plate having at least one hinge pin thereon extending along a tangent to the flat plate, and wherein the seat and cage of the cartridge assembly comprise a unitary structure forming an annular seating face sized to mate with the disc and a pair of hinge pin supports receiving the opposite end portions of the hinge pin.

3. A valve as defined in claim 2 wherein each hinge pin support is generally U-shaped in cross section.

4. A valve as defined in claim 2 wherein each hinge pin support is sized larger than the diameter of the hinge pin, whereby the disc can float upstream and downstream in a near closed position.

5. A valve as defined in claim 2 wherein at least a portion of the outer periphery of the unitary structure fits in a mating counterbore in the valve chamber.

6. A valve as defined in claim 5 wherein the projection means extends upstream from the unitary structure to engage the valve body in one position thereof to assist in the removal of the unitary structure from said counterbore.

7. A valve as defined in claim 5 wherein the projection means comprises two threaded projections extending downstream from diametrically opposed locations of the valve cartridge assembly.

8. A valve as defined in claim 2 wherein the unitary structure has a flat surface between the hinge pin supports to prevent transverse rotation of the valve cartridge assembly within the valve chamber by engaging the bonnet when the bonnet is attached over the access opening.

9. A valve as defined in claim 2 further comprising:
   a positioning lug protruding from the valve body into the valve chamber and supporting the valve cartridge assembly in alignment for the disc to prevent flow through the valve chamber in the upstream direction.

10. A valve as defined in claim 1 wherein the projection means and abutment surfaces comprise:
    a plurality of projections threaded into and extending downstream from the unitary structure; and
    a plurality of lugs extending from the body into the valve chamber downstream from the valve cartridge assembly;
    wherein each projection engages at least one of the lugs to prevent the valve cartridge from moving downstream.

11. A valve as defined in claim 1 wherein the disc is a generally circular flat plate having at least one hinge pin thereon extending along a tangent to the flat plate, the seat has a seating face thereon facing downstream and sized to mate with the disc and the cage has a pair of hinge pin supports thereon receiving the opposite end portions of the hinge pin.

12. A valve as defined in claim 11 wherein the hinge pin supports face upstream and the seat traps the hinge pin in the hinge pin supports.

13. A valve as defined in claim 11 wherein the seat has an annular shoulder and the cage has an upstream extension mating with the annular shoulder of the seat.

14. A valve as defined in claim 11 wherein the projection means and abutment surfaces comprise:
    a plurality of projections threaded into and extending downstream from the cage; and
    a plurality of lugs extending from the body into the valve chamber downstream from the valve cartridge assembly;
    wherein each projection engages at least one of the lugs to prevent the valve cartridge from moving downstream.

15. A valve as defined in claim 11 wherein the cage has a cut-out allowing the disc to pivot to an open position in relation to the seating face of the seat.

16. A valve as defined in claim 11 wherein the cage has a downstream extension to limit the opening movement of the disc.

17. A valve as defined in claim 16 wherein the downstream extension of the cage has a cushion protruding into the valve chamber such that the disc strikes the cushion when the disc pivots into the open position.

18. A valve as defined in claim 11 wherein the projection means and abutment surfaces comprise:
- a plurality of projections threaded into and extending downstream from the seat; and
- a plurality of lugs extending from the body into the valve chamber downstream from the valve cartridge assembly;
- wherein each projection extends through a slot formed in the cage and engages at least one of the lugs to prevent the valve cartridge from moving downstream.

19. A valve as defined in claim 11 wherein the cage includes an arcuate recess mating with the annular shoulder of the seat.

20. A valve as defined in claim 19 further comprising:
- a cushion spring support removably attached to the upper surface of the cage; and
- a cushion spring removably attached to the cushion spring support, the cushion spring extending downstream from the cushion spring support.

21. A valve as defined in claim 20 wherein the cushion spring support includes a lip extending downward for at least a portion of the upstream end of the cushion spring support, the lip having a downstream face engaging the upper upstream face of the cage.

* * * * *